Dec. 13, 1960 A. W. SCRIBNER 2,964,177
CONTINUOUS EXTRUSION
Filed July 2, 1959 3 Sheets-Sheet 1

Albert W. Scribner

Dec. 13, 1960     A. W. SCRIBNER     2,964,177
CONTINUOUS EXTRUSION
Filed July 2, 1959     3 Sheets-Sheet 2
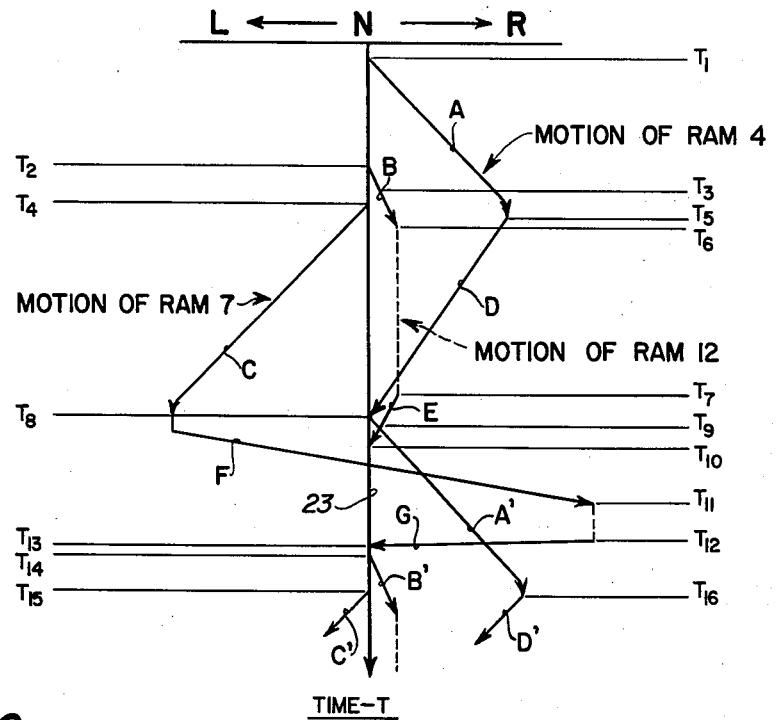
Fig_6
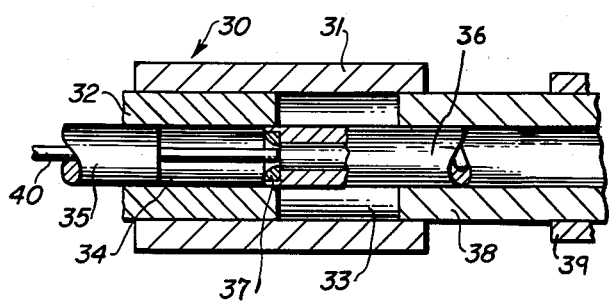
Fig_7
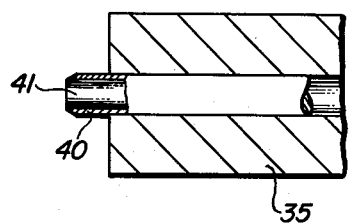
Fig_8
Albert W. Scribner

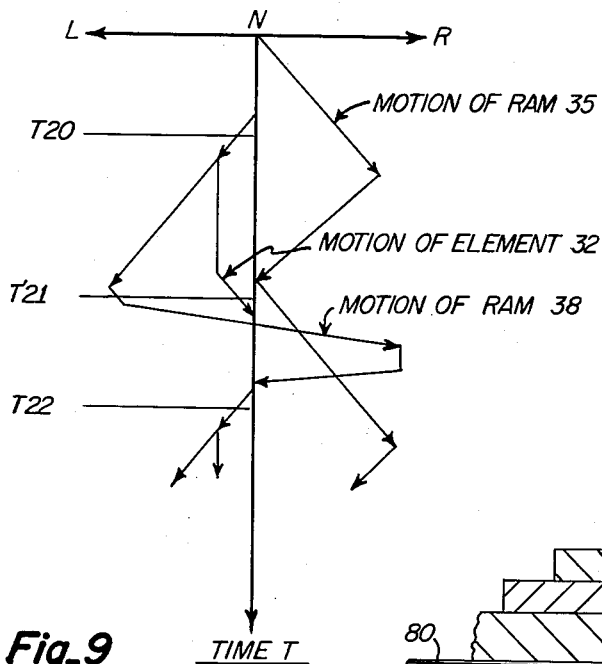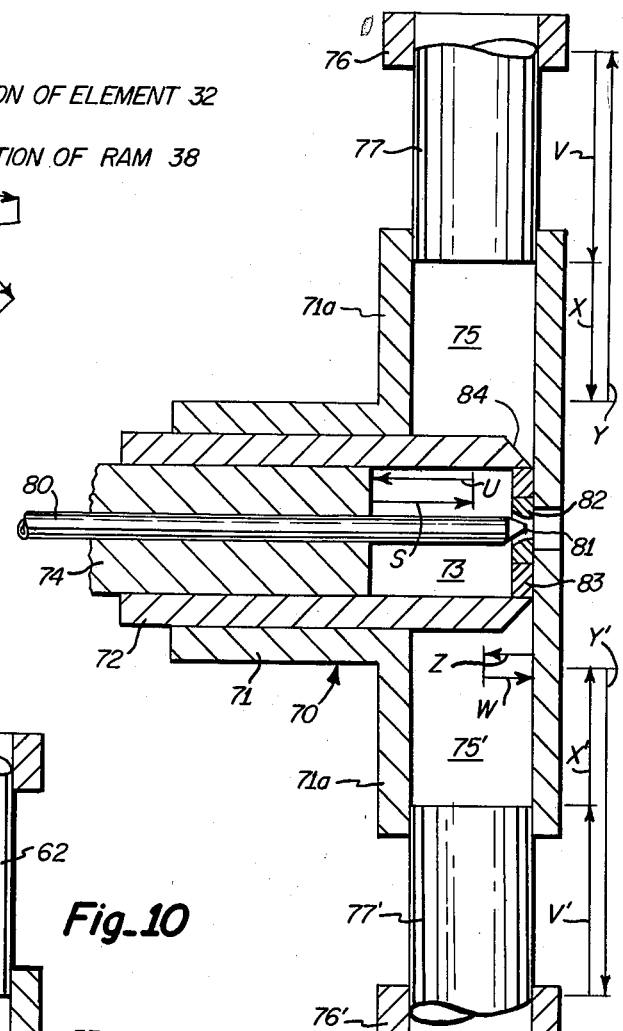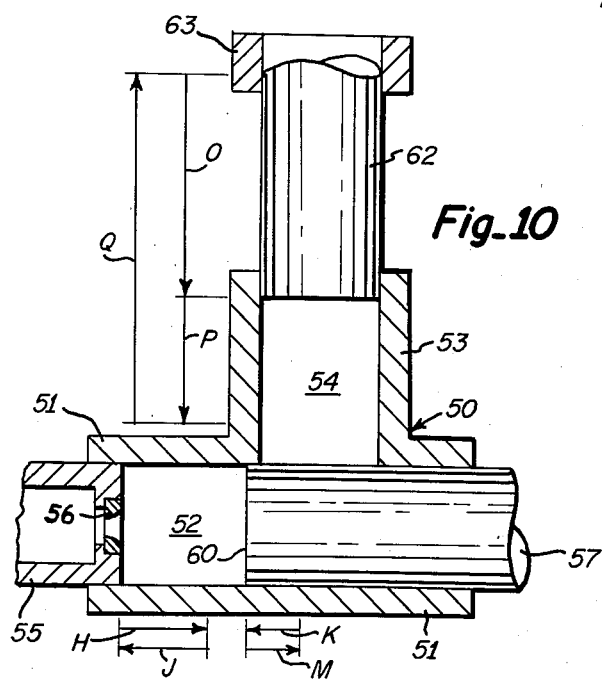

United States Patent Office 2,964,177
Patented Dec. 13, 1960

2,964,177

CONTINUOUS EXTRUSION

Albert W. Scribner, 89 Grennan Road,
West Hartford, Conn.

Filed July 2, 1959, Ser. No. 824,691

5 Claims. (Cl. 207—2)

This invention relates to an improved method and apparatus for continuously die expressing a work material and more particularly relates to a novel method and apparatus for sequentially die expressing a series of work billets so that the work metal flows continuously and uninterrupted through an extrusion die orifice.

This application is a continuation in part of my co-pending case Serial No. 666,632, filed June 19, 1957, for Method and Apparatus for Continuous Extrusion, now abandoned.

In conventional types of extrusion presses that are capable of and used for extruding billets of solid metal the press container is first charged with a cylindrical billet having a predetermined amount of solid metal and most of the latter is then forced through the extrusion die orifice by a ram means so as to form a desired product. At the completion of the forward operative stroke of the press the flow of metal through the die orifice ceases and subsequently either one of two procedures is used depending on the type of extruded product desired. In the first of these two procedures the extruded and unextruded material are mutually severed and removed from the press and the container is recharged preparatory for another operative stroke of the press which will form a second individual extrusion that is similar to that just formed. In the second of said two procedures the extruded and unextruded material are not removed from the press, the container being recharged with another metal billet which is then forced through said die orifice with the unextruded portion of the previous charge so as to increase the length of the single elongated extrusion to be formed.

It should be noted that in each of these two die expressing procedures the flow of metal through the extrusion die orifice ceases after each forward or operative stroke of the press ram means. This interruption of the extrusion operation necessitated by the need for recharging the press container imposes several limitations on the efficiency and functional capacity of conventional type presses. The nature of these limitations as they affect each of said two procedures will be considered.

In the first procedure, wherein a series of individual extruded products are to be formed, all of the metal which is to constitute any one individual extrusion must be in the press container at the beginning of the extrusion operation so that the press ram means may thereafter work all of this solid metal charge in one single heavy extrusion stroke. As will be apparent when it is desired to produce large extrusions the press container must be initially charged with a correspondingly large work billet having the necessary volume of metal. The difficulty here is that as the required size of the billet to be worked progressively increases the required size and capacity of the conventional single-stroke type press must also increase, such increase usually being accompanied by a disproportionately larger increase in the cost involved. These characteristics impose severe limitations on the maximum potential use of the extrusion process. The demand for larger and larger extrusions has advanced to the point where the economic feasibility of continuing the constant enlarging of the size of conventional type presses becomes questionable. Such single stroke presses have already been designed and built with capacities in excess of 12,000 tons and the industry has contemplated capacities reaching 20,000 tons and higher. The cost of housing, fabricating, installing and operating such massive presses and related equipment will represent an investment of over a million dollars. With this in mind the need for an efficient, inexpensive and relatively small size press that is capable of producing very large extrusions becomes more evident and critical.

The second of the above mentioned procedures wherein the successive billets of solid metal are serially die expressed to form a single extruded product such as in cable sheathing operations will now be considered. The difficulty encountered here is that as the solid metal billets are successively die expressed the flow of metal through the extrusion die orifice must be periodically interrupted due to the ever present necessity of intermittently recharging the press container. During the recharging operations the forward extrusion stroke of the ram means is stopped and the resultant relaxing of the extrusion pressures on the work metal and the stoppage of metal flow through the die orifice tend to cause the unextruded metal to "freeze." Repeated occurrence of such "freezing" during the sheathing operations contributes to the formation of the well known but undesirable "bamboo" type joints between the successive sections of extruded sheath. The mechanical qualities of the metal constituting such joints are in most cases inferior to that of the remaining sheath portions and such increases the possibility of subsequent cracking or other mechanical failure. A great deal of effort has been expended in an attempt to overcome this problem, the need being for a continuous flow of work metal through the extrusion orifice.

The instant invention contemplates the provision of an improved method and apparatus for overcoming the difficulties noted in each of the two above discussed types of procedures whereby only a small portion of the necessary work material need be in the press container at any one time and whereby the metal flow through the extrusion orifice is continuous even though recharging of the press container occurs intermittently. In applications where large extrusions are to be formed a press of the type disclosed herein having a capacity of say 750 tons might be used to produce the same extrusions that presently require the use of conventional type presses having capacities of 6,000 to 8,000 tons or higher. The instant presses also lends itself for use in applicatians where indefinitely long extrusions are to be formed such as the noted cable sheathing, collapsible tubing, special types of strip such as "tube in strip," and wire and similar products which may be wound onto a drum.

Many prior art devices have been developed for continuously die expressing viscous, liquid, granular and similar "soft" materials. For example, several different type of devices have been built to continuously extrude molten lead so as to form a cable sheath. In similar fashion various devices having reciprocating or rotary type rams have been developed to extrude paste-like materials such as molten lead, wax etc. These devices however, although perhaps sufficient for the purposes intended, fall short of being able to die express billets of solid metal wherein working presses in the order of 100,000 to 200,000 pounds per square inch are required.

One object of the invention is to provide a novel method and apparatus for continuously die expressing billets of solid metal.

Another object of the instant invention is to provide a novel method and apparatus for extruding a series of solid work billets whereby the work metal flows continuously and uninterrupted through the extrusion die orifice.

Another object of the invention is to provide an improved extrusion press for continuously extruding a series of solid metal billets wherein an extrusion chamber is alternately communicated with and isolated from a billet feed chamber such that when these chambers are in communicating relation the work material in said feed chamber will be immediately adjacent to and displaced into said extrusion chamber during the die expressing of the material already in said extrusion chamber, and when said chambers are in mutually isolated relation said billet feed chamber may be opened and the next work billet placed therein while the die expressing of the work metal in said extrusion chamber continues.

Another object of the invention is to provide a novel extrusion press for continuously die expressing a series of solid metal billets whereby a first chamber is alternately closed off from and opened to a second chamber by means of a ram which is reciprocated longitudinally of the associated end of said first chamber.

Another object of the invention is to provide a novel extrusion press for continuously die expressing a series of solid metal billets whereby an extrusion chamber is alternately closed off from and opened to a coaxially disposed billet feed chamber.

A further object of the invention is to provide a novel extrusion press that is capable of continuously die expressing a series of solid metal billets whereby an extrusion chamber is alternately communicated with and isolated from a separate billet feed chamber by means of a ram that has an effective cross sectional profile that is substantially the same as that of the adjacent end of said extrusion chamber.

Still another object of the invention is to provide a novel extrusion press having two rams respectively disposed in two communicating work receiving chambers and having another ram mounted in substantially coaxially relation with respect to at least one of the other two rams for closing off one of said chambers from the other of said chambers.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 6 is a sketch showing a typical timing diagram for the apparatus of Figure 1.

Figures 7 and 8 are partial axial sectional views respectively showing a modified embodiment of the apparatus shown in Figure 1.

Figure 9 is a sketch showing a typical timing diagram for the operation of the apparatus shown in Figures 7 and 8.

Figures 10 and 11 are partial axial sectional views showing two other embodiments of the instant apparatus wherein the axes of the work receiving chambers are disposed at an angle with one another.

Figure 1:
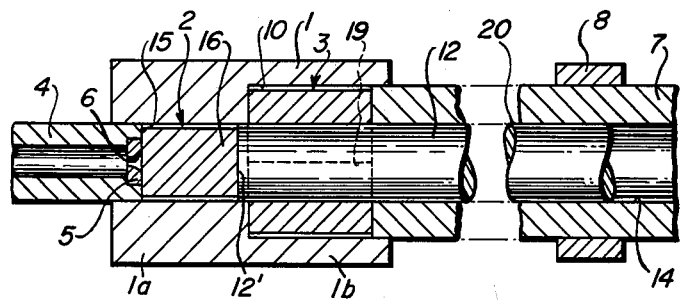
Figure 1 is a partial axial sectional view showing the construction and arrangement of the principal parts of one embodiment of the extrusion press contemplated by the instant invention.

Referring to Figure 1 there is shown a container 1 having a portion 1a which defines a cylindrical extrusion chamber 2 opened at both ends, and another portion or means 1b which, in combination with ram means to be described, defines a billet feed chamber 3. The chambers 2 and 3 are coaxially disposed in coextensive end to end relation and have different cross sectional areas. Slidably mounted for reciprocating movement at the outer or left end of chamber 2 is a power operated tubular ram 4 which operatively supports a die 5 having an extrusion orifice 6 formed therein. A tubular power operated ram 7 is slidably supported in a fixed housing 8 and is adapted to be axially moved into and out of sliding engagement with the inner walls 10 forming the chamber 3. A power operated ram 12 is slidably supported by the inner walls 14 of ram 7, the diameters and cross sectional profiles of ram 12 and chamber 2 being substantially the same as that for the ram 4 whereby both of said rams 4 and 12 may operatively slidably engage the cylindrical inner walls 15 forming said chamber 2. The ram 12 may be axially reciprocated so that its inner end is selectively movable into and out of engagement with said container walls 15 at the inner or right end of the chamber 2, thereby closing off and opening the associated end of chamber 2 and thus respectively preventing and permitting the flow of work material from chamber 3 into chamber 2. The container 1 and the housing 8 are suitably supported on a machine base. Rams 4, 7 and 12 may be actuated by hydraulic motors having interrelated controls whereby the hereinafter described respective sequential and timed movement of these three rams may be effected.

Either or both of the rams 4 and 12 are initially withdrawn from chamber 2 to allow a cylindrical work billet 16 to be placed in chamber 2. Rams 4 and 12 are then advanced into the chamber 2 to their respective initial or normal positions shown in Figure 1 where they respectively engage the opposed ends of said billet. The ram 7 is retracted and two semi-annular cross sectioned billets forming a composite tubular billet 19 are placed over the outer surface 20 of ram 12 and ram 7 is then advanced so as to move said composite billet 19 into the annular work receiving chamber cooperatively defined by the outer cylindrical walls of rams 12 and the walls 10 of chamber 3 as shown in Figure 1. The inside and outside diameters of said billet 19 respectively correspond to the outside diameter of ram 12 and the inside diameter of the chamber 3. The ram 7 in its initial or normal position is in engagement with the adjacent end of billet 19, as shown in Figure 1, and applies thereto a static axial compressive force.

Figure 2:
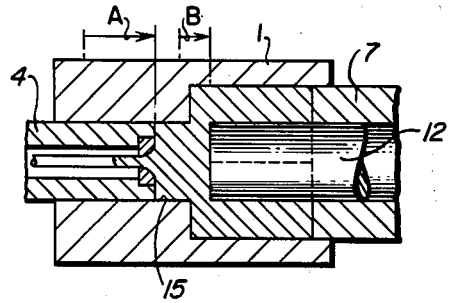
Figures 2–5 are partial axial sectional views illustrating the sequential operation of the various parts of the press shown in Figure 1.
Figure 3:
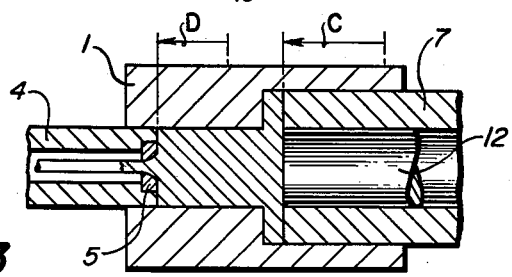
Figure 4:
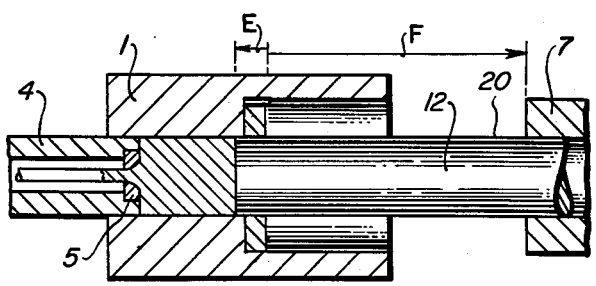
Figure 5:
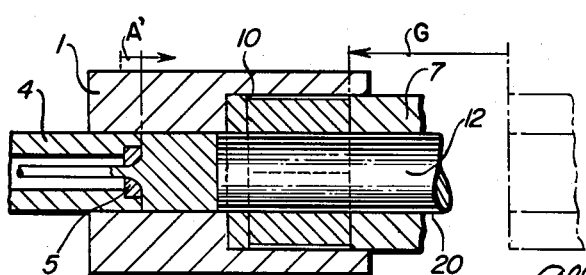

The sequential operation of the rams 4, 7 and 12 is illustrated by Figures 2–5. The extrusion operation is initiated by advancing the ram 4 through a forward working stroke A, Figure 2. Before the completion of stroke A ram 12 is retracted through a shorter stroke B, Figure 2, the rate of volumetric displacement of ram 4 always being greater than that of ram 12. Thus a portion of the billet 16 is continually being die expressed during said strokes A and B. During the retractive stroke B the end 12' of ram 12 will move out of sliding engagement with the walls 15 of chamber 2 thereby opening the inner end of chamber 2 and communicating chambers 2 and 3 as shown in Figure 2. At this time the work metal being die expressed in chamber 2 will not tend to be forced into chamber 3 because of the existence of said static force applied to the billet 19 by ram 7; thus said work metal will continue to flow through orifice 6. Just before the termination of stroke A a forward working stroke C, Figure 3, of the ram 7 is initiated thereby progressively forcing successive portions of the billet 19 into chamber 2, and pressure welding the forward end portion of billet 19 to the rearward end portion of the billet 16. During the initial part of stroke C the strokes A and B will be completed after which time ram 12 will temporarily remain stationary with respect to container 1 while ram 4 commences a reverse or retractive stroke D, Figure 3. Stroke D will continue during the major part of stroke C, the volumetric rate of displacement of ram 4 during said stroke D being less than that for the stroke C whereby the effective combined volume of the communicating chambers 2 and 3 is always decreasing thus causing the continued die expressing of the welded or fused work material originally comprising billets 16 and 19. Shortly before the end of stroke C ram 12 commences an operative forward stroke E, Figure 4, thereby entering a short distance into chamber 2 so as to slidably engage the walls 15 of chamber 2 and thereby close off chamber 2 from chamber 3. At or shortly before the time that the ram 12 enters chamber 2 ram 7 will complete its working stroke C and immediately after ram 12 has so entered chamber 2 ram 7 will be rapidly withdrawn through a retractive stroke F, Figure 4, to allow a recharging of chamber 3 with another composite tubular billet. Meanwhile the terminal part of stroke E will cause the metal in chamber 2 to continue to flow through orifice 6. Immediately after the completion of stroke D and before the completion of stroke E, ram 4 commences a second forward working stroke A', Figure 5, corresponding to the stroke A and such will continue the die expressing of the metal in chamber 2 after the completion of said stroke E. As ram 4 partakes of stroke A' the ram 7 advances with the next tubular work billet through a feed stroke G, Figure 5, to its said normal position shown in Figure 1, wherein a static force is again applied to the work material by said ram 7. Chambers 2 and 3 will be effectively separated during said strokes F and G. Before the end of stroke A' the ram 12 will again commence a second retractive stroke B' corresponding to stroke B thereby again communicating chambers 2 and 3 so that the metal comprising the second tubular billet may be fused with other work material in the press and displaced into chamber 2 and out through the extrusion orifice 6 in a working cycle that is similar to the one just described in connection with the first tubular billet 19.

It will be seen that there is always an extrusion force applied to the work metal in chamber 2 by at least one of the rams 4, 7 and 12 thereby giving rise to a continuous flow of metal through the die orifice 6. Thus although the recharging of the chambers 2 and 3 is intermittent the flow of work metal through the extrusion die 5 is continuous. The operative rate of volumetric displacement of ram 7 during stroke C is always greater than that for ram 4 during the same time period of stroke D so that the then enlarging chamber 2 may be refilled during this part of the extrusion operation. It will be noted that at the moment the inner end of chamber 2 is opened to chamber 3 by retraction of ram 12 the work metal of billet 16 is immediately adjacent and available to the material of billet 19, the valving action of ram 12 being such that no unfilled spaces are created through which the material of billet 19 must flow in order to reach and fuse with the material of billet 16.

Figure 6 shows an illustrative timing diagram for the sequential operation of rams 4, 7 and 12 as they respectively move to the right R and/or the left L of their respective normal positions N; said respective normal positions being illustrated in Figure 1. The vertical line 23 designates time T. The chambers 2 and 3 are communicated at a time T3 during the stroke B and are effectively separated at time T9 during stroke E. The recharging of chamber 3 occurs between T11 and T12 and the stroke G ends at time T13. The end of the line designating stroke A and the beginning of the line designating stroke C, Figure 6, are appropriately curved and chronologically overlapped so that the combined action of the strokes A, B and C between T3 and T6 produces a metal flow through the extrusion orifice 6 which not only is continuous but also occurs at a substantially constant mass rate. The other corresponding transitions between the successive operative strokes of the rams may be similarly controlled whereby the extrusion flow rate for the entire operation may be made substantially constant. The strokes A through G, Figure 6, are sequentially repeated A', B', C', etc., as many times as is necessary to produce the desired length of extruded product. The times T1 and T7 indicate the beginning of strokes A and E respectively, while the times T5 and T10 respectively indicate the ends of strokes A and E. Time T8 indicates the beginning of stroke A' as well as the termination of strokes C and D. The times T14, T15, T16, which respectively denote the beginning of strokes B', C' and D' of the second cycle of operation, respectively correspond to the relative times T2, T4 and T5 of the first cycle of operation. It will be understood that various modifications in the timing diagram shown in Figure 6 may be made; for example stroke A' may commence just before termination of stroke C. All such modifications however will embody the same concept of operation; namely that an extrusion force is continuously applied at all times to the metal located adjacent the extrusion die 5 thereby causing an uninterrupted flow of metal through the die orifice 6.

If desired any one of the various known techniques may be employed to insure that no air spaces occur in the chamber 2 and 3 during and/or after charging, for example the successive tubular work billets such as 19 may be heated and inserted into chamber 3 in a manner illustrated by U.S. Patents 2,639,809 and/or 2,639,810.

It will be apparent that in the construction of the apparatus of Figures 1–5 the die 5 may be mounted at the inner end 12' of ram 12, ram 4 then being solid and ram 12 being tubular; and that one or more of the various movements between the rams 4, 7 and 12 relative to container 1 may be correspondingly effected by movement of container 1 relative to one or more of said rams. It will also be apparent that die 5 may be operatively mounted in container 1 by being secured to ram 4 or ram 12 as noted above or by being supported in the side wall of the container 1 in a region between the inner limits of movement of the respective rams 4 and 12 whereby a "side wall" type of extrusion flow will result during the die expressing operation. The material comprising each successive billet introduced into the press in a given operation may be the same or may differ and the cross sectional shape of said chambers may differ. Also the relative radial position of the respective chamber 2 and 3 and/or rams 4 and 12 may be varied from that shown in Figures 1–6; that is the axes of two or more of these elements may be longitudinally aligned by being parallel instead of coaxial.

Figure 7 shows a second embodiment of the instant invention, one which is particularly adapted for cable sheathing operations. Here the container 30 comprises outer and inner coaxially nested and relatively slidable tubular container elements 31 and 32. The outer container element or means 31, in combination with ram means to be described, defines an annular billet feed chamber 33 while the inner container element 32 defines a coextensive coaxial cylindrical extrusion chamber 34. Slidably mounted for axial reciprocating movement at the outer or left end of extrusion chamber 34 is a power operated tubular ram 35. Ram 35 cooperates with a substantially coaxially disposed tubular ram 36 which is disposed at the other end of chamber 34 and which operatively supports an extrusion die 37, the effective cross sectional profiles of chamber 34 and rams 35 and 36 being substantially the same. A power operated tubular ram 38 slidably mounted by a support member 39 is adapted to be axially reciprocated into and out of sliding engagement with the inner cylindrical walls of container element 31. The container 30 and support member 39 are suitably supported on a machine base. Rams 35, 38 and 36 respectively correspond to rams 4, 7 and 12 of Figure 1, however here ram 36 is mounted so as to be axially stationary while the tubular container element 32 is adapted to be axially moved into and out of sliding engagement with the adjacent end of said ram 36 so that the inner end of the extrusion chamber 34 may be respectively closed off from and opened to the billet feed chamber 33 in a manner similar to the action produced by the axial movement of ram 12 of Figure 1. A tubular cable guiding mandrel 40 is coaxially disposed in the tubular ram 35 and has an inner end 41, Figure 8, which cooperates in the usual manner with the extrusion orifice in die 37. By having the ram 36 stationarily mounted the die 37 and mandrel 40 may also be held axially stationary during the extrusion operation thereby leaving only the three press elements 32, 35 and 38 needing sequential actuation. The normal positions of the parts are shown in Figure 7. The mandrel 40 and/or the orifice in die 37 may have solid cross sections of various profiles whereby various types of tubular extrusions may be produced. If desired the diameter of ram 36 can be made greater than that for chamber 34 whereby said element 32 may be moved into and out of abutting relation with the radial end surfaces of the ram 36 so as to open and close the corresponding end of chamber 34.

Figure 9 is similar in nature to Figure 6 and shows a typical timing diagram for the sequential operation of the container element 32 and the rams 35 and 38 as they respectively move to the right R and/or to the left L from their respective normal or initial positions N during time T. As will be seen in Figure 9 the forward and retractive strokes of rams 35 and 38 correspond to the respective forward and retractive strokes A, D and C, F, G of rams 4 and 7 of Figures 1 and 6, however the forward and retractive strokes of the element 32 are generally opposite in direction to that of the ram 12 of Figures 1 and 6. The inner end of chamber 34 is opened, closed, opened, etc., at times T20, T21, T22 respectively by the axial reciprocating motion of the container element 32. The construction and operational timing here again permits an intermittent charging of the billet feed chamber 33 while the work metal in extrusion chamber 34 continuously flows through the extrusion die orifice. Several modifications may be made in this timing diagram however the concept in each case will again be the same, namely that an extrusion force is continually applied to the work material in chamber 34.

Figure 10 illustrates another embodiment of the invention. Here instead of having the extrusion chamber and the feed chamber coaxially disposed as in the presses discussed in connection with Figures 1 and 7, the work receiving chambers are here disposed so that their axes are disposed at an angle with one another. Container 50 comprises a first portion 51, which defines an extrusion chamber 52 opened at both ends, and a second portion or means 53 which, in combination with ram means to be described, defines a billet feed chamber 54, the axis of chamber 52 being substantially normal to the axis of chamber 54. Slidably mounted for axial reciprocating movement at the outer or left end of chamber 52 is a power operated tubular ram 55 which operatively supports an extrusion die 56. Ram 55 is adapted to be moved through a forward stroke H and a reverse or retractive stroke J. Movably mounted at the other end of chamber 52 is an opposed coaxially disposed ram 57 the inner end 60 of which has a cross sectional profile that is substantially the same as that for the ram 55 and the chamber 52. Ram 57 is adapted to axially move through a forward stroke K and a retractive stroke M so as to move into and out of operative engagement with the walls defining the adjacent end of said chamber 52. This action will serve to respectively close off and open the associated right end of the extrusion chamber 52 so that chamber 52 is alternately communicated with and isolated from the feed chamber 54. A power operated ram 62 is slidably mounted in a fixed support member 63 and is adapted to be axially moved through forward feed and work strokes O and P respectively and a retractive stroke Q so as to move into and out of sliding engagement with the container walls defining the feed chamber 54. The cross sectional area of chamber 54 is preferably substantially the same as that for chamber 52 and the length of the forward working stroke P is greater than the length of the retractive stroke J. The container 50 and support member 63 are suitably mounted on a machine base and the respective normal positions for rams 55, 57 and 62 are as shown in Figure 10.

The volumetric displacements and relative timing of strokes H, J, K, M, O, P and Q respectively correspond to the volumetric displacements and relative timing of strokes A, D, E, B, G, C and F of Figures 2–5 and 6 so that an extrusion force may be continually applied to the work material in chamber 52. This construction and operational timing of the press parts will permit an intermittent recharging of the billet feed chamber 54 and a simultaneous continuous flow of work material through the extrusion die 56 in a manner similar to that described above in connection with Figures 1–6.

It will be apparent that any suitable type mandrel may be employed with the apparatus of Figure 10 and that the die 56 may be appropriately mounted on either of the rams 60 and 62, or in the side walls of the container portions 51 or 53. If die 56 is mounted on ram 60 chamber 52 continues to act as an extrusion chamber and the timing of the three rams is the same as before. If die 56 is mounted on ram 62 chamber 54 acts as the extrusion chamber, chamber 52 becomes the billet feed chamber and the strokes and relative operational timing of rams 55 and 62 are interchanged, that is the ram 62 moves through forward and reverse strokes corresponding to H and J while ram 55 moves through forward and reverse strokes corresponding to O, P, Q to thereby maintain a continuous extrusion force on the work material in chamber 54. The rams 55 and/or 60 and their respectively associated container bores may be disposed at various angles with respect to the ram 62. In such cases, as in Figure 10, the rams 55, 60 and 62 still extend toward a substantially common point in the container.

Another embodiment of the invention is illustrated in Figure 11, this apparatus, like that of Figure 10, having two angularly disposed work receiving chambers and, like that of Figure 7, being particularly adapted for cable sheathing operations. Here a container 70 has an outer container element or means 71 and an inner coaxially nested tubular element 72; the latter defining an extrusion chamber 73 open at both ends. Slidably mounted at the outer or left end of chamber 73 is a power operated tubular ram 74 that is adapted to axially reciprocate through a forward stroke S and a reverse or retractive stroke U. The container element 71 slidably supports the inner tubular element 72 and is formed, by means of walls 71a, with a pair of similar opposed or coaxial billet feed chambers 75 and 75' whose axes are disposed substantially normal with respect to the axis of chamber 73 and whose cross sectional areas are each preferably substantially equal to that of chamber 73. Slidably mounted by means of support members 76 and 76' are two power operated rams 77 and 77' which are respectively adapted to axially move into and out of sliding engagement with the container walls 71a defining the chambers 75 and 75'. The container 70 and the mounting or support members 76, 76' are suitably fixed to a machine base. Ram 77 is displaced through forward feed and working strokes V and X respectively and through a retractive stroke Y, ram 77' being simultaneously intermittently displaced through the identical forward and retractive strokes V', X' and Y' respectively. A tublar cable guiding mandrel 80 extends axially through said tubular ram 74 and has a tapered inner end 81 which is operatively disposed with respect to the orifice of an extrusion die 82 that is operatively mounted on the walls 71a of container element 71 by means of the stationary support 83 which corresponds to the ram 36 of Figure 7. The cross sectional profile of the stationary support 83 is substantially the same as that for chamber 73 so that the coaxially movable inner container element 72 may be displaced through a forward stroke W and retractive stroke Z, thereby moving the tapered end thereof into and out of operative engagement with the cylindrical outer surfaces of said support 83 whereby the associated end of the extrusion chamber 73 may be respectively closed off from and opened to the billet feed chambers 75 and 75'. The container element 72 and the ram 74 respectively correspond to the container element 32 and ram 35 of Figure 7, while both rams 77 and 77' correspond to the ram 38 of said Figure 7. It will be understood that the die 82 may be mounted flush with or in recessed relation with respect to the inner surfaces of walls 71a in which case it will be understood that the stationary support 83 disposed at the inner end of the extrusion chamber 73 will be defined by that portion of the container walls which operatively closes off the said inner end of chamber 73 from chambers 75, 75' when said container element 72 is in its normal or forward position shown in Figure 11 wherein the contoured inner end of element 72 will abut the correspondingly contoured walls 71a.

The volumetric displacements and timing of the strokes W—Z, S—U, and VV'—XX'—YY' respectively correspond to that for the operative strokes of the container element 32, ram 35 and ram 38 of Figures 7-9 so that an extrusion force may be continually applied to the work material in chamber 73. This construction and operational timing of the press parts will permit an intermittent recharging of the billet feed chambers 75, 75' and a simultaneous continuous flow of work material through the extrusion die 82 in a manner similar to that described above in connection with Figures 1-6 and 7-9.

While several embodiments of the invention have been shown and described, it will apparent to those skilled in the art that numerous variations and modifications may be made in the particular construction without departing from the underlying principles of the invention. It is therefore desired, by the following claims, to include within the scope of the invention all such variations and modifications whereby substantially the results of the invention may be obtained by the use of substantially the same or equivalent means.

The invention claimed is:

1. In an extrusion press; a container having two billet receiving chambers which are disposed in coextensive end to end relation and which have different cross sectional areas, a first ram slidably mounted at the outer end of one of said chambers, a second ram opposed to and substantially coaxially disposed with respect to said first ram and extending through the other of said chambers, said second ram being adapted to move into and out of sliding engagement with the walls defining the other end of said one of said chambers, an extrusion die operatively mounted on one of the two above mentioned rams, the latter ram being hollow to allow the extruded product to pass therethrough, and a third ram mounted for movement into and out of sliding engagement with the walls defining said other of said chambers and being substantially concentric over and slidably disposed with respect to said second ram, the three above individually mentioned rams being movable in predetermined timed relation so that said chambers are alternately communicated with and isolated from each other by said second ram and an extrusion force is continually applied to the work material in said one chamber by at least one of said three rams.

2. Cable sheathing apparatus comprising: a billet container having a through cavity passing from one end to the other and having a branch cavity open to the outside and joining said through cavity near the midportion thereof, the aforesaid through and branch cavities each being of uniform-sized bore along the respective axes thereof; a first hollow ram mating with and slidable in said branch cavity, said ram having an end contour-shaped as said through cavity and adapted to butt against the wall thereof thus closing and sealing off said through cavity; a female extrusion die fixed to said container at said wall of said through cavity, said die being axially aligned with said branch cavity and said first hollow ram, and said die having a die opening therethrough centered above a corresponding opening through said wall; a hollow male extrusion die adapted to be held in fixed position aligned with said die opening, said male die having a rearwardly extending shank portion of substantially uniform outside diameter; a second hollow ram mating with and slidable in the axial bore of said first hollow ram, said second hollow ram having an axial bore which mates with and is slidable over said shank portion; third and fourth solid rams, each mounted to enter a respective end of said through cavity and to mate therewith and be slidable therein; whereby said first ram acts as a valve sealing off said through cavity during the loading thereof with fresh workmetal and said second ram continues to apply pressure to workmetal enclosed by said first ram, said second ram, said wall, and said female die during said loading, and whereby at the completion of said loading and after said third and fourth rams have applied pressure to the fresh workmetal charge, said first ram and said second ram are retracted, and continuous and uninterrupted cable sheathing is thus effected.

3. In an extrusion press; a container having two billet receiving chambers which are disposed in coextensive end to end relation and which have different cross sectional areas, a first ram slidably mounted at the outer end of one of said chambers, a second ram opposed to and substantially coaxially disposed with respect to said first ram and extending through the other of said chambers, the container walls defining the other end of said one of said chambers being adapted to move into and out of sliding engagement with said second ram, an extrusion die operatively mounted on one of the two above mentioned rams, the latter ram being hollow to allow the extruded product to pass therethrough, and a third ram mounted for movement into and out of sliding engagement with the walls defining said other of said chambers and being substantially concentric over and slidably disposed with respect to said second ram, the first and third rams and the said container walls being movable in predetermined timed relation so that said chambers are alternately communicated with and isolated from each other by said second ram and an extrusion force is continually applied to the work material in said one chamber by at least one of the three above mentioned movable elements.

4. In an extrusion press; a container having two billet receiving chambers which are disposed in laterally coextensive end to end relation, the axes of said chambers being disposed at an angle with respect to each other, a first ram slidably mounted at the outer end of one of said chambers, a second ram opposed to and substantially coaxially disposed with respect to said first ram and extending past the end of the other of said chambers, said second ram being adapted to move into and out of sliding engagement with the walls defining the other end of said one of said chambers, an extrusion die operatively mounted on one of the two above mentioned rams, the latter ram being hollow to allow the extruded product to pass therethrough, and a third ram mounted for movement into and out of sliding engagement with the walls defining said other of said chambers and being laterally and slidably disposed with respect to said second ram, the three above individually mentioned rams being movable in predetermined timed relation so that said chambers are alternately communicated with and isolated from each other by said second ram and an extrusion force is continually applied to the work material in said one chamber by at least one of said three rams.

5. In an extrusion press; a container having two billet receiving chambers which are disposed in coextensive end to end relation and which have different cross sectional areas, a first ram slidably mounted at the outer end of one of said chambers, a second ram opposed to and substantially coaxially disposed with respect to said first ram and extending through the other of said chambers, said second ram being adapted to move into and out of sliding engagement with the walls defining the other end of said one of said chambers, an extrusion die operatively mounted with respect to said first ram, said second ram, and said container, and a third ram mounted for movement into and out of sliding engagement with the walls defining said other of said chambers and being substantially concentric over and slidably disposed with respect to said second ram, the three above individually mentioned rams being movable in predetermined timed relation so that said chambers are alternately communicated with and isolated from each other by said second ram and an extrusion force is continually applied to the work material in said one chamber by at least one of said three rams.

References Cited in the file of this patent

UNITED STATES PATENTS

| | | |
|---|---|---|
| 5,253 | Cornell | Aug. 2, 1847 |
| 529,215 | Tatham | Nov. 13, 1894 |
| 1,177,097 | Garretson | Mar. 28, 1916 |
| 1,664,976 | Hanff | Apr. 3, 1928 |
| 1,720,722 | Dean | July 16, 1929 |
| 2,366,417 | MacMillin | Jan. 2, 1945 |
| 2,485,523 | Ashbaugh | Oct. 18, 1949 |
| 2,620,922 | Deutsch | Dec. 9, 1952 |
| 2,920,760 | Genders | Jan. 12, 1960 |

FOREIGN PATENTS

| | | |
|---|---|---|
| 643,990 | Great Britain | Oct. 4, 1950 |
| 759,135 | Great Britain | Oct. 17, 1956 |
| 440,542 | Germany | Feb. 10, 1927 |
| 844,287 | Germany | July 17, 1952 |
| 1,040,485 | Germany | Oct. 9, 1958 |
| 1,141,055 | France | Mar. 11, 1957 |